United States Patent
Yang et al.

(10) Patent No.: US 10,810,012 B1
(45) Date of Patent: *Oct. 20, 2020

(54) COMPUTER VISION IMPLEMENTING CALCULATIONS OF WINDOW SUMS IN OVERLAPPING WINDOWS

(71) Applicant: Ambarella International LP, Santa Clara, CA (US)

(72) Inventors: Wen Wan Yang, San Francisco, CA (US); Peter Verplaetse, Redwood City, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,808

(22) Filed: Dec. 19, 2019

Related U.S. Application Data

(63) Continuation of application No. 15/372,995, filed on Dec. 8, 2016, now Pat. No. 10,552,151.

(51) Int. Cl.
    *G06F 9/30* (2018.01)
(52) U.S. Cl.
    CPC ........ *G06F 9/30036* (2013.01); *G06F 9/3001* (2013.01)
(58) Field of Classification Search
    CPC .......................... G06F 9/3001; G06F 9/30036
    See application file for complete search history.

(56) References Cited

U.S. PATENT DOCUMENTS

| | | | |
|---|---|---|---|
| 5,890,094 A | 3/1999 | Zschau | 702/15 |
| 10,552,151 B1 * | 2/2020 | Yang | G06F 7/00 |
| 2006/0013473 A1 | 1/2006 | Woodfill | 382/154 |
| 2006/0023217 A1 | 2/2006 | Bangalore | 356/416 |
| 2014/0185951 A1 | 7/2014 | Ziegler | 382/255 |
| 2016/0086783 A1 | 3/2016 | Cox | 250/282 |

* cited by examiner

*Primary Examiner* — Keith E Vicary
(74) *Attorney, Agent, or Firm* — Christopher P. Maiorana, PC

(57) ABSTRACT

An apparatus includes a memory and a circuit. The memory may be configured to store a first array of data values, a second array of first modification values, and a third array of second modification values. The circuit may be configured to (a) calculate a plurality of window values for each window position of a first sliding window as the first sliding window is stepped by a predetermined step size along a particular axis of the first array of data values, and (b) calculate the first and the second modification values by summing portions of the first array of data values that correspond to the predetermined step size of the first sliding window. A first window value of an initial position of the first sliding window may be calculated by summing portions of the first array of data values encompassed by the first sliding window at the initial position, and each remaining window value of the plurality of window values may be calculated by using one of the first modification values and one of the second modification values corresponding to a current position of the first sliding window to modify the window value corresponding to a preceding sliding window position.

20 Claims, 11 Drawing Sheets

COMPUTER VISION IMPLEMENTING CALCULATIONS OF WINDOW SUMS IN OVERLAPPING WINDOWS

This application relates to U.S. Ser. No. 15/372,995, filed Dec. 8, 2016, which is incorporated by reference in its entirety.

FIELD OF THE INVENTION

The invention relates to computer vision processing generally and, more particularly, to a method and/or apparatus for implementing calculations of window sums in overlapping windows.

BACKGROUND

Conventional computer vision implementations are designed to use as little bandwidth and hardware as practical, and strive to maximize an output data rate. In practice, many conventional designs include some form of hardware drawbacks or limitations. A common design approach is to fetch the input data and sum the data values for each window separately. The separate fetches and summations are inefficient. Memory bandwidth is wasted due to redundant fetches. Separately summing up each window also results in a low output data rate, especially with large overlaps and large window sizes. To mitigate the bandwidth issue, other common designs use a row buffer to avoid re-fetching the same data. However, the row buffers utilize significant hardware, thereby limiting the flexibility of window sizes.

It would be desirable to implement calculations of window sums in overlapping windows.

SUMMARY

The invention concerns an apparatus comprising a memory and a circuit. The memory may be configured to store a first array of data values, a second array of first modification values, and a third array of second modification values. The circuit may be configured to (a) calculate a plurality of window values for each window position of a first sliding window as the first sliding window is stepped by a predetermined step size along a particular axis of the first array of data values, and (b) calculate the first and the second modification values by summing portions of the first array of data values that correspond to the predetermined step size of the first sliding window. A first window value of an initial position of the first sliding window may be calculated by summing portions of the first array of data values encompassed by the first sliding window at the initial position, and each remaining window value of the plurality of window values may be calculated by using one of the first modification values and one of the second modification values corresponding to a current position of the first sliding window to modify the window value corresponding to a preceding sliding window position.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing calculations of window sums in overlapping windows that may (i) minimize memory bandwidth consumption, (ii) use minimal hardware for flexible window configurations, (iii) maximize an output data rate (iv) operate with overlapping windows, (v) operate on input data and output data in parallel, (vi) avoid large memories and/or (vii) be implemented as one or more integrated circuits.

Embodiments of the invention generally provide an architecture and technique to operate efficiently on input data and output data in parallel, while avoiding large memories. The invention may sum up input data values within overlapping windows in a multidimensional array. In various embodiments, the multidimensional array may be a two-dimensional array, a three-dimensional array, a four-dimensional array, and so on. The input data values of the multidimensional array may be fetched externally from a memory and the data values within the extracted windows may be summed. Effective processing of the data values within two-dimensional windows generally support the tasks of analyzing and understanding digital images in the computer vision systems.

Figure 1:
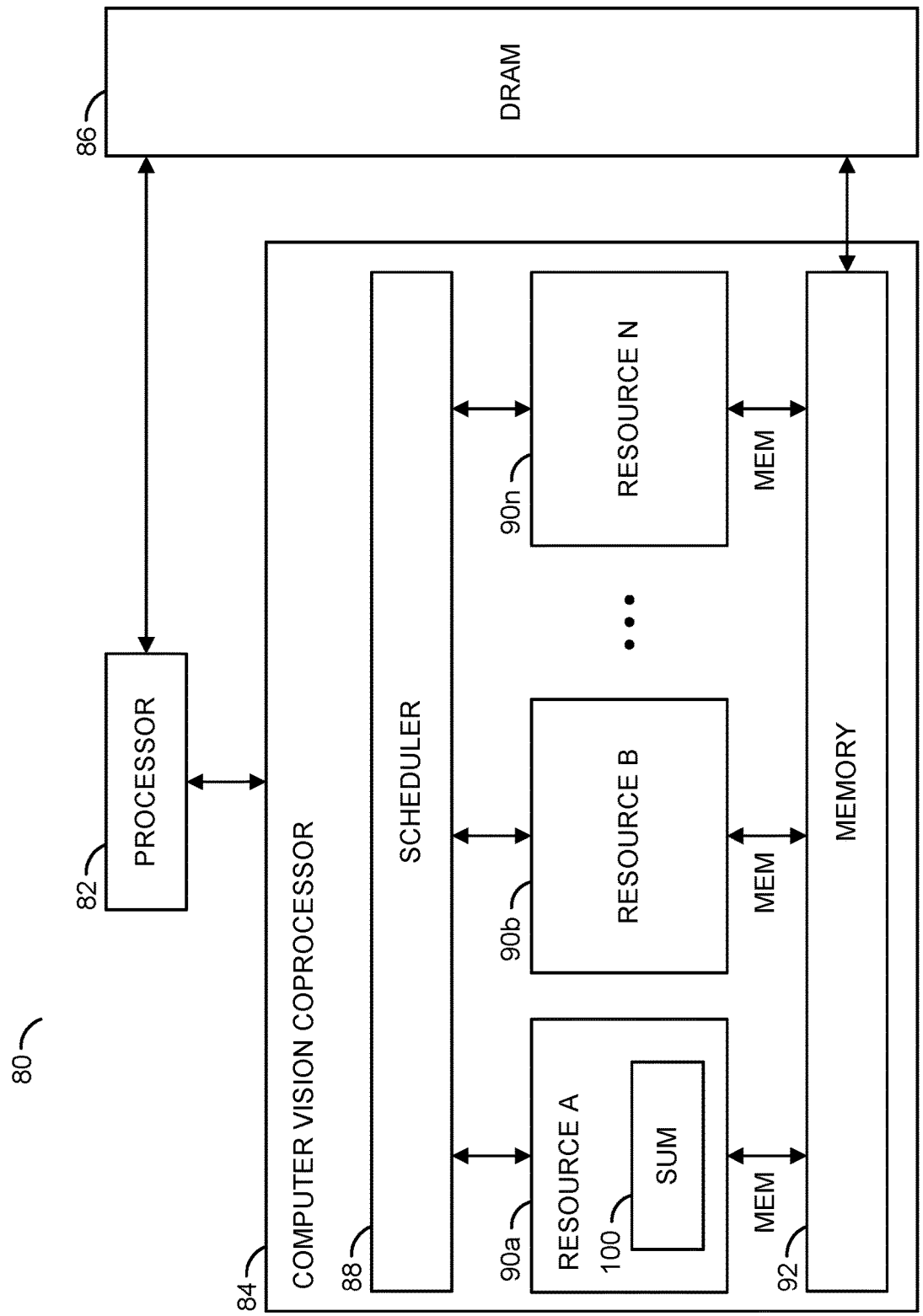
FIG. 1 is a diagram of a system.

Referring to FIG. 1, a diagram of a system 80 is shown. The system (or apparatus) 80 may implement a computer vision system. The apparatus 80 may be implemented as part of a camera, a computer, a server (e.g., a cloud server) a telephone (e.g., a smart phone), a personal digital assistant, or the like. The apparatus 80 generally comprises a block (or circuit) 82, a block (or circuit) 84, and a block (or circuit) 86. The circuit 84 generally comprises a block (or circuit) 88, one or more blocks (or circuits) 90a-90n, and a block (or circuit) 92. One or more of the circuits 90a-90n (e.g., circuit 90a as shown) generally comprises a block (or circuit) 100.

The circuit 82 may implement a processor circuit. In some embodiments, the processor circuit 82 may be a general purpose processor circuit. The processor circuit 82 may be operational to interact with the circuit 84 and the circuit 86 to perform various computer vision tasks.

The circuit 84 may implement a coprocessor circuit. In some embodiments, the coprocessor circuit 84 may be computer vision coprocessor circuit 84. The coprocessor circuit 84 is generally operational to perform specific computer vision tasks as arranged by the processor circuit 82.

The circuit 86 may implement a dynamic random access memory (DRAM) circuit. The DRAM circuit 86 is generally operational to store multidimensional arrays of input data and various forms of output data. The DRAM circuit 86 may exchange the input data and the output data with the processor circuit 82 and the coprocessor circuit 84.

The circuit 88 may implement a scheduler circuit. The scheduler circuit 88 is generally operational to schedule tasks among the circuits 90a-90n to perform a variety of computer vision tasks as defined by the processor circuit 82. Individual tasks may be allocated by the scheduler circuit 88 to the circuits 90a-90n.

Each circuit 90a-90n may implement a processing resource (or engine). The resource circuits 90a-90n are generally operational to perform specific processing tasks. In some configurations, the resource circuits 90a-90n may operate in parallel and independent of each other. In other configurations, the resource circuits 90a-90n may operate collectively among each other to perform allocated tasks. The resource circuits 90a-90n may be homogenous processing resources (all circuits 90a-90n may have the same capabilities) or heterogeneous processing resources (two or more circuits 90a-90n may have different capabilities). In various embodiments, the resource circuits 90a-90n may be implemented as only hardware circuits.

The circuit 92 may implement a memory circuit. The memory circuit 92 is generally operational to store portions of the multidimensional arrays of input data and output data generated by the resource circuits 90a-90n. The input data may be received from the DRAM circuit 86 via a memory bus. The output data may be sent to the DRAM circuit 86 via the memory bus.

The circuit 100 may implement a summation circuit. The summation circuit 100 is generally operational to fetch a plurality of data vectors from the memory circuit 92. Each data vector generally comprises a plurality of the data values. The summation circuit 100 may also be operational to calculate a plurality of vector values by summing said data values in a corresponding one of said data vectors. A plurality of modification values may be calculated, based on the data values, by summing a plurality of vector values. A value of a window may be calculated by summing a plurality of the vector values. Another value of another window may be calculated by adding to the value of the window a next one of the modification values and subtracting from the value of the window a previous one of the modification values. The other window generally overlaps the window in the multidimensional array along a particular axis. The summation circuit 100 may be in communication with the memory circuit 92 to receive the input data and present the output data. In various embodiments, the summation circuit 100 may be implemented as only hardware.

Figure 2:
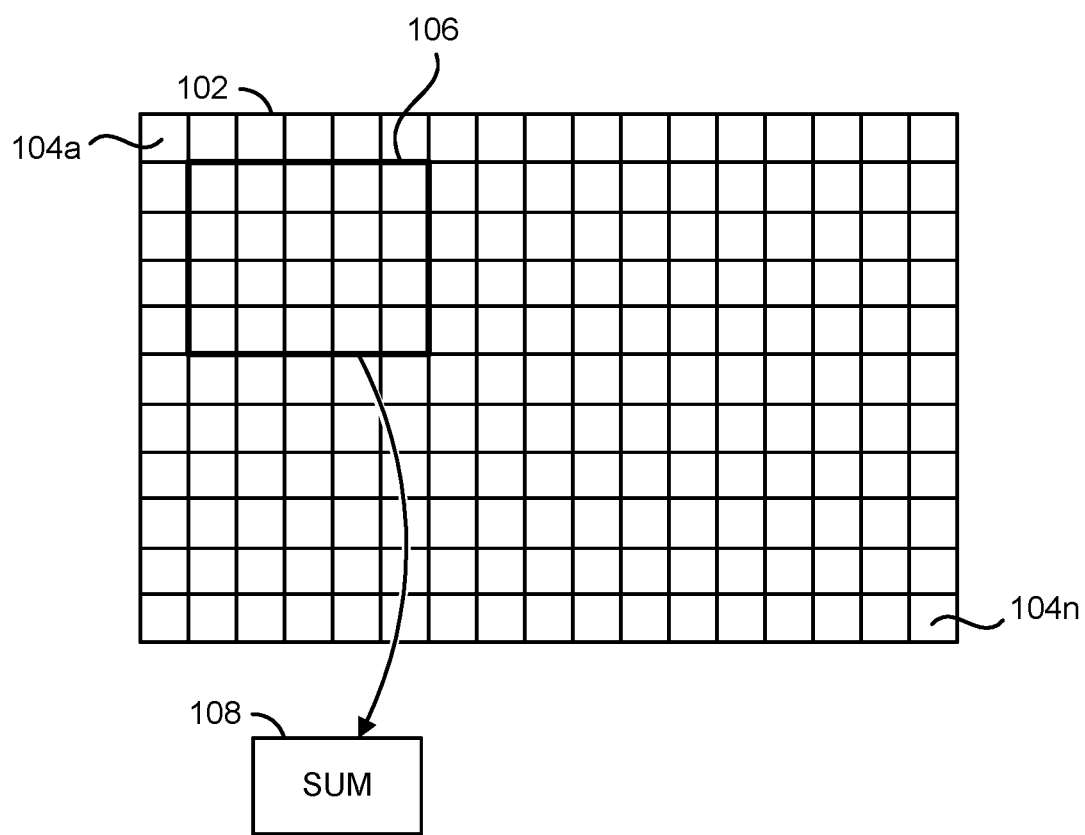
FIG. 2 is a diagram of a two-dimensional array of input data.

Referring to FIG. 2, a diagram of an example two-dimensional array 102 of input data is shown. The two-dimensional array 102 generally comprises multiple data values 104a-104n. In typical computer vision applications, the data values 104a-104n may be pixel values from a camera or other two-dimensional sensor. During some computer vision tasks, the data values 104a-104n may be transferred from the DRAM circuit 86 to the memory circuit 92, a few columns or rows at a time. The summation circuit 100 may sum the data values 104a-104n within a sliding window 106 to generate a sum value 108. The sum value 108 may be stored back in the memory circuit 92 and subsequently transferred to the DRAM circuit 86.

The apparatus 80 generally utilizes sub-accumulations of overlapping portions of multiple windows 106 by processing the data values in a horizontal or vertical sliding fashion. A bandwidth of the memory circuit 92 may be saved by initially accumulating vertical columns (e.g., vectors) by summing the windows 106 in a horizontal sliding fashion.

The apparatus 80 may calculate the sum value of the data values inside the horizontally adjacent and overlapping windows 106. Each window 106 may have a height (e.g., H) and a width (e.g., W) along a two-dimensional plane.

Figure 3:
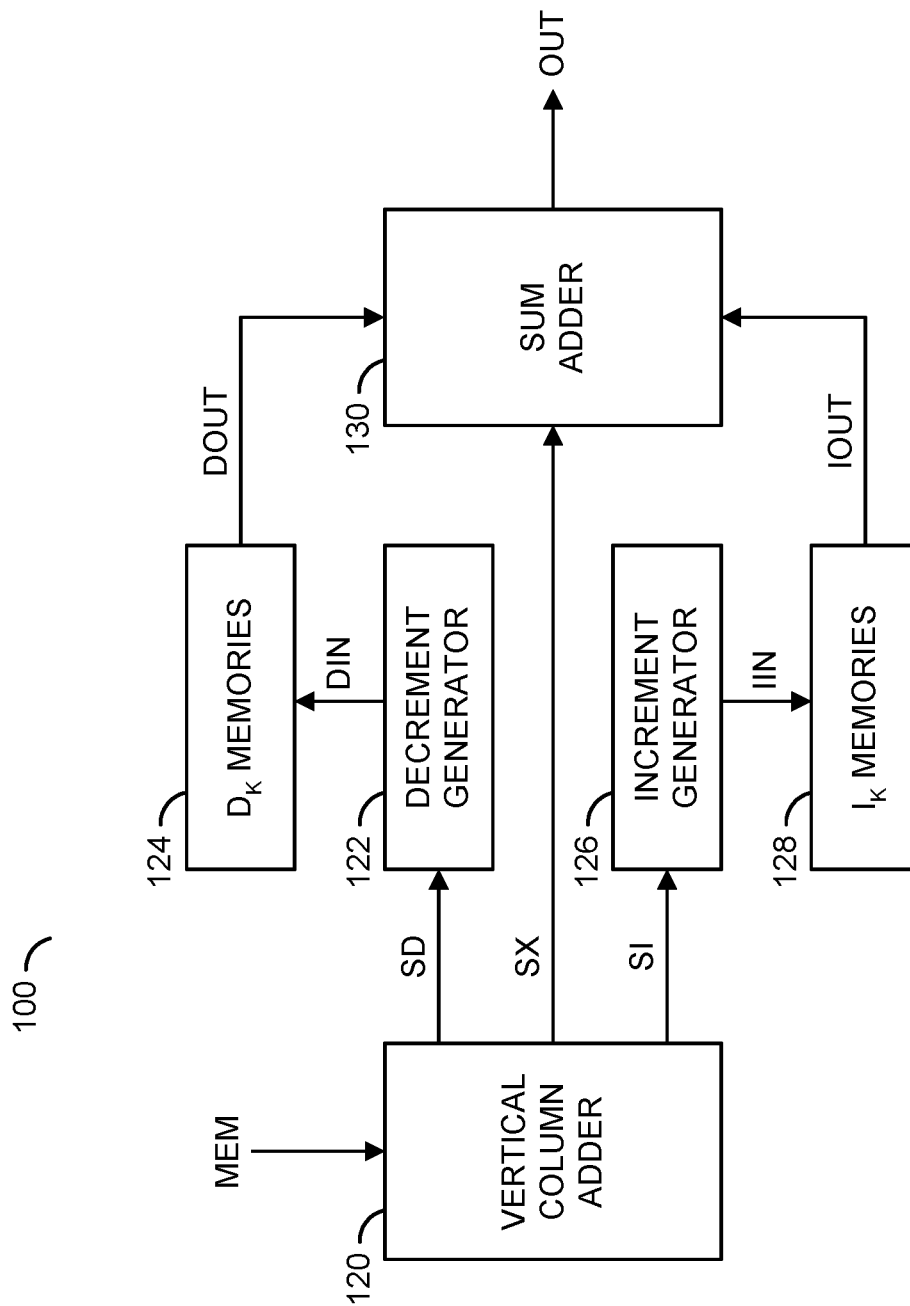
FIG. 3 is a diagram of a summation circuit in the system in accordance with an embodiment of the invention.

Referring to FIG. 3, a diagram of an example implementation of the summation circuit 100 is shown in accordance with an embodiment of the invention. The summation circuit 100 generally comprises a block (or circuit) 120, a block (or circuit) 122, a block (or circuit) 124, a block (or circuit) 126, a block (or circuit) 128, and a block (or circuit) 130. In various embodiments, the circuits 120-130 may be implemented only in hardware.

A signal (e.g., MEM) may be received by the circuit 120 from the memory circuit 92. The signal MEM may convey the input data of a multidimensional array. A signal (e.g., SD) may be generated by the circuit 120 and presented to the circuit 122. The signal SD may carry decrement vector values that represent summations of portions (e.g., columns) of the input data values. A signal (e.g., SI) may be generated by the circuit 120 and presented to the circuit 126. The signal SI may carry increment vector values that represent summations of portions of the input data values. A signal (e.g., SX) may be generated by the circuit 120 and presented to the circuit 130. The signal SX may carry initial vector values that represent summations of portions of the input data values.

The circuit 122 may generate a signal (e.g., DIN) received by the circuit 124. The signal DIN may convey decrement modification values (e.g., summations of multiple decrement vector values) to be buffered. A signal (e.g., DOUT) may be generated by the circuit 124 and presented to the circuit 130. The signal DOUT may carry the decrement modification values as buffered. The circuit 126 may generate a signal (e.g., IIN) received by the circuit 128. The signal IIN may convey increment modification values (e.g., summations of multiple increment vector values) to be buffered. A signal (e.g., IOUT) may be generated by the circuit 128 and presented to the circuit 130. The signal IOUT may carry the increment modification values as buffered. The circuit 130 may generate a signal (e.g., OUT). The signal OUT generally carries the sum values of the individual windows 106. In some embodiments, the signal OUT may be the signal MEM to transfer the sum values to the memory circuit 92.

The circuit 120 may implement a vertical column adder circuit. The adder circuit 120 may be operational to calculate vector values by adding columns (or vectors) of data values as the data values are received in the signal MEM. The individual vector values may be routed to the signals SD, SX and/or SI based on window locations within the multidimensional array 106.

The circuit 122 may implement a decrement generator circuit. The decrement generator circuit 122 is generally operational to calculate the decrement modification values by adding the decrement vector values from groups of decrement vectors received in the signal SD. The decrement modification values may be presented to the circuit 124 in the signal DIN.

The circuit 124 may implement a decrement ($D_K$) memory circuit. The $D_K$ memory circuit 124 is generally operational to buffer (or store) the decrement modification values received in the signal DIN. The decrement modification values may be transferred to the circuit 130 in the signal DOUT.

The circuit 126 may implement an increment generator circuit. The increment generator circuit 126 is generally operational to calculate the increment modification values by adding the increment vector values from groups of increment vectors received in the signal SI. The increment modification values may be presented to the circuit 128 in the signal IIN.

The circuit 128 may implement an increment ($I_K$) memory circuit. The $I_K$ memory circuit 128 is generally operational to buffer (or store) the increment modification values received in the signal IIN. The increment modification values may be transferred to the circuit 130 in the signal IOUT.

The circuit 130 may implement a summation adder circuit. The summation adder circuit 130 is generally operational to generate an initial sum value 108 for an initial window 106. Subsequent sum values 108 for overlapping windows 106 may be calculated by adding an increment modification value as received in the signal IOUT, and subtracting a decrement modification value as received in the signal DOUT, to a previous sum value 108. Each sum value may be buffered in the memory circuit 92 via the signal OUT (e.g., the signal OUT=the signal MEM).

Figure 4:
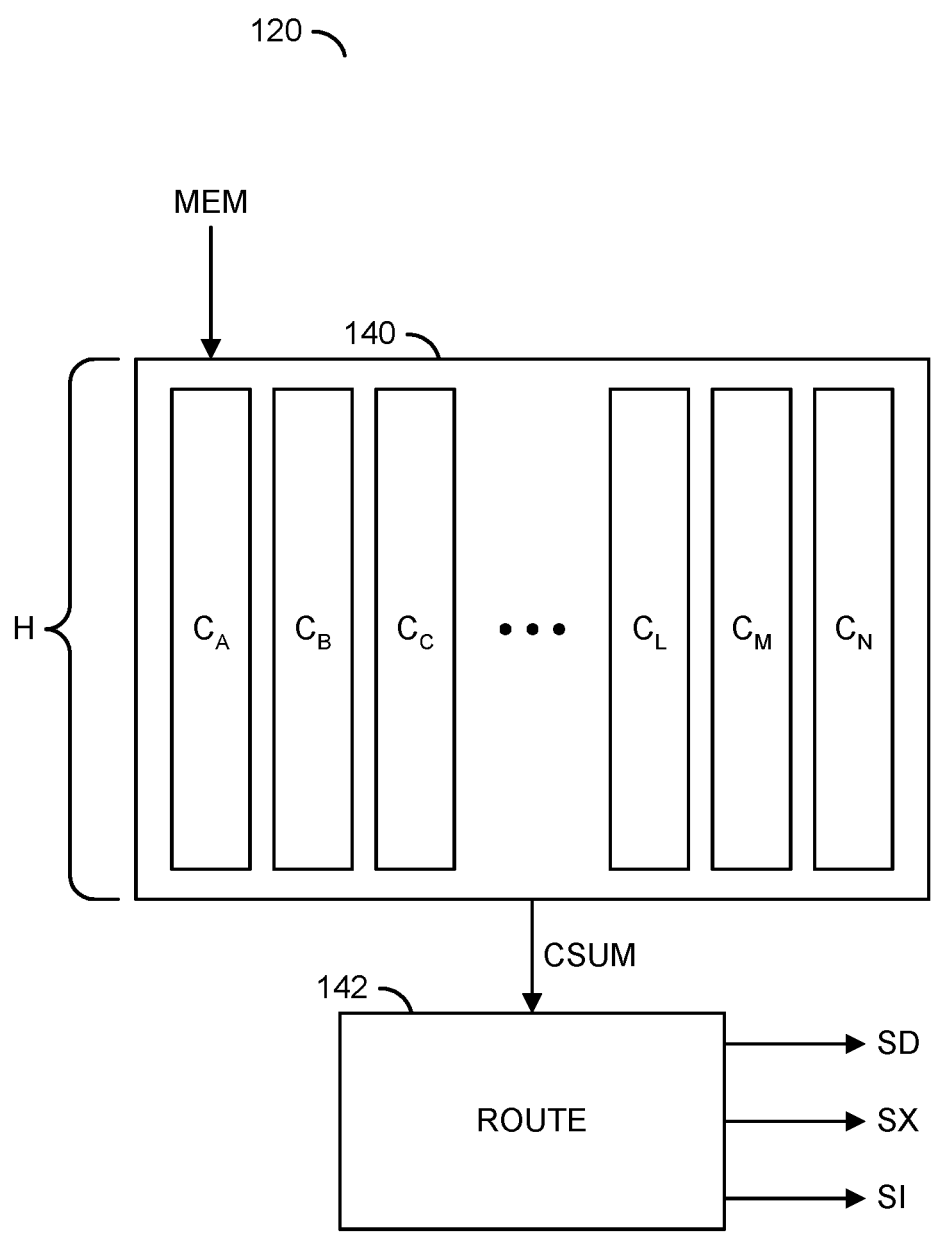
FIG. 4 is a diagram of a vertical column adder circuit.

Referring to FIG. 4, a diagram of an example implementation of the vertical column adder circuit 120 is shown. The vertical column adder circuit 120 generally comprises a block (or circuit) 140, and a block (or circuit) 142.

The signal MEM may be received by the circuit 140. A signal (e.g., CSUM) may be generated by the circuit 140 and presented to the circuit 142. The signal CSUM may carry column vector sum values. The circuit 142 may generate the signals SD, SX and SI.

The circuit 140 may implement one or more vector adder circuits. The vector adder circuits 140 are generally operational to add column vectors of the input data values as received in the signal MEM. As illustrated in the example, the vector adder circuits 140 may add the input data value for columns $C_A$ to $C_N$. Each column $C_A$ to $C_N$ may have the height H of the window 106, where H represents the number of input data values in each column $C_A$ to $C_N$. In some embodiments, N vector adder circuits 140 may be implemented, an adder circuit for each column $C_A$ to $C_N$, respectively. In other embodiments, fewer than N vector adder circuits 140 may be implemented, with one or more of the vector adder circuit 140 being responsible for more than one column $C_A$ to $C_N$ in a time division manner. In still other embodiments, greater than N adder circuits 140 may be implemented to allow for adjustments to other window widths. Likewise, each adder circuit 140 may be designed to accommodate fewer than H input data values (e.g., time-share additions), H input data values in parallel, or greater than H input data values (e.g., unused positions may be zero) simultaneously. The individual vector values may be presented in the signal CSUM to the circuit 142.

The circuit 142 may implement a router circuit. The router circuit 142 is generally operational to route (or direct) the vector values to one or more of the signals SD, SX and SI, as appropriate. The vector values used only for calculating the initial sum value 108 of the initial window 106 may be presented in the signal SX. The vector values used to modify the initial one or more sum values 108 (e.g., one or more leftmost windows) may be presented in the signal SD. The vector values used only to increment previous sum values 108 (e.g., a rightmost window 106 in the two-dimensional array 102) may be presented in the signal SI. The other vector values may be used to modify the initial sum value 108 and subsequent sum values 108 and so are generally presented in both the signals SD and SI.

Figure 5:
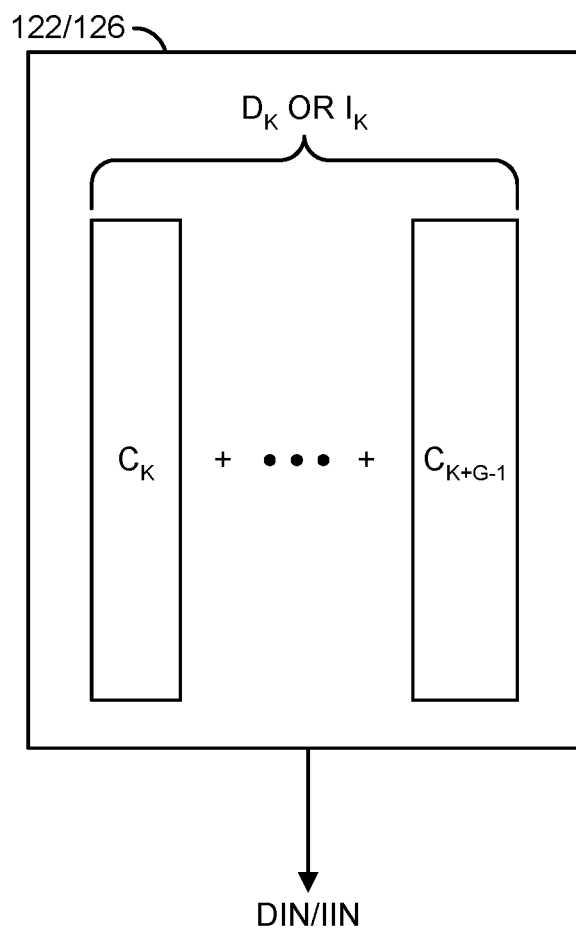
FIG. 5 is a diagram of operations in a decrement generator circuit and an increment generator circuit.

Referring to FIG. 5, a diagram of an example operation of the decrement generator circuit 122 and the increment generator circuit 126 is shown. The vector values are received in the signals SD for the decrement generator circuit 122 and SI for the increment generator circuit 126. The decimation modification values may represent a horizontal decimation factor (e.g., HDF). The decimation factor HDF generally defines a horizontal distance between adjacent overlapping windows 106. To avoid summing up individual windows 106 separately, accumulated sums of column vectors of the externally fetched input data may be calculated and stored. The column vector sums may be grouped into several columns and added to form the decimation modification (or sub-accumulation) values. Likewise, the column vector sums may be grouped into several columns and added to form the increment modification values. The decimation modification values and the increment modification values may effectively be the differences between each neighboring overlapping window 106.

Given the left and right boundaries of an initial window 106, two sets of modification (or sub-accumulation) values may be generated. As illustrated, multiple (e.g., G) vector values from G columns (e.g., column $C_K$ to column $C_{K+G-1}$) may be added to form the decrement modification values for a decrement group $D_K$ (e.g., a decrement modification array) or the increment modification values for an increment group $I_K$ (e.g., an increment modification array). Generally, the number G of columns may be the same for both groups $D_K$ and $I_K$. The resulting decrement modification values may be presented in the signal DIN. The resulting increment modification values may be presented in the signal IIN.

The sum values (e.g., $S_n$) may be determined by the summation adder circuit 130 for subsequent windows per formula 1 as follows:

$$S_n = S_{n-1} - D_{n-1} + I_{n-1} \quad (1)$$

Formula 1 generally defines a steady state where $S_{n-1}$ may be the sum value of any individual window. The value $D_{n-1}$ may be the subtracted modification value (difference between the current and previous windows). The value $I_{n-1}$ may be the added modification value (difference between the current and next windows). The two sets of modification values $D_{n-1}$ and $I_{n-1}$ may be stored in the memories 124 and 128 for future usage.

Figure 6:
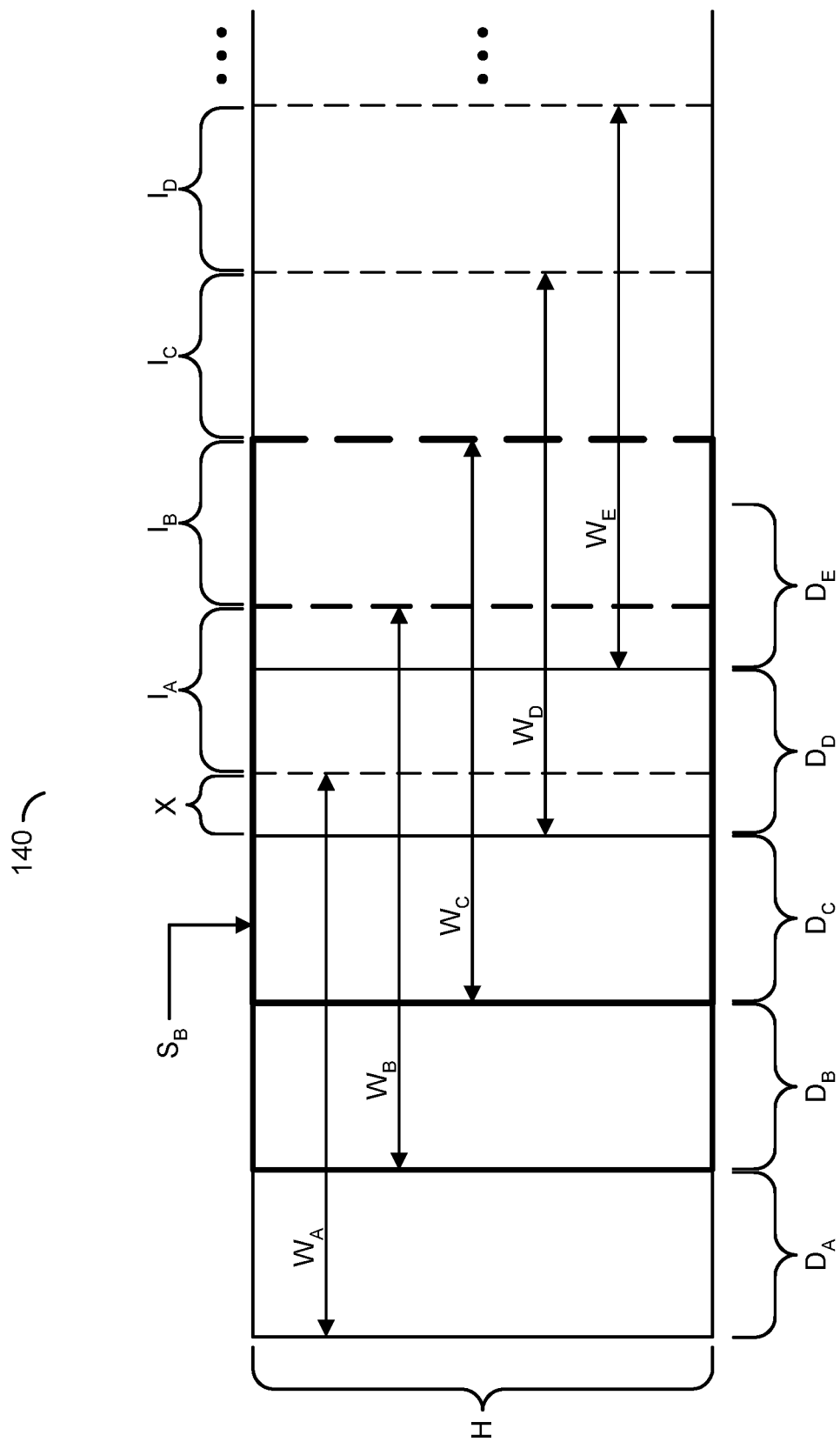
FIG. 6 is a diagram of a set of overlapping sliding windows in one dimension.

Referring to FIG. 6, a diagram of an example set of overlapping sliding windows in one dimension is shown. The windows (e.g., $H \times W_A$ to $H \times W_E$) are generally defined by widths $W_A$ to $W_E$. In various embodiments, the widths $W_A$ to $W_E$ may be the same (e.g., $W_A = W_B = W_C = W_D = W_E$). In other embodiments, two or more of the widths $W_A$ to $W_E$ may be different from each other (e.g., $W_C \neq W_E$). Each window may have the height H. The window in the width $W_A$ may be a leftmost window in the multidimensional array 102.

An initial sum value (e.g., $S_A$) of an initial window (e.g., $H \times W_A$) in the width $W_A$ may be a sum of the vector values used to create the decimation modification value $D_A$, $D_B$, $D_C$ and the initial vector values in the column X. The vector values used to calculate the sum value $S_A$ may be transferred to the summation adder circuit 130 in the signal SX. Where the width $W_A$ matches the modification array widths for $D_A$, $D_B$, $D_C$ and a width of the columns X, and the width of the columns X is not the same as the widths of the modification arrays, the width WA may be a non-integer number of the modification arrays.

A sum value (e.g., $S_B$) of a next window (e.g., $H \times W_B$) in the width $W_B$ may be calculated by subtracting the decimation modification value $D_A$ and adding the increment modification value $I_A$ to the sum value $S_A$ per formula 1. In a similar manner, a sum value (e.g., $S_C$) of the next window (e.g., H×W$_C$) in the width W$_C$ may be calculated by subtracting the decimation modification value D$_B$ and adding the increment modification value I$_B$ to the sum value S$_B$ per formula 1. The above subtraction of the decrement modification values and addition of the increment modification values may continue for subsequent windows (e.g., H×W$_D$, H×W$_E$, etc. . . . ) to the right of the width W$_C$. In some embodiments, the direction of the windows may be reversed such that the initial window is a rightmost window and the sum values are calculated right-to-left across the multidimensional array 102.

Figure 7:
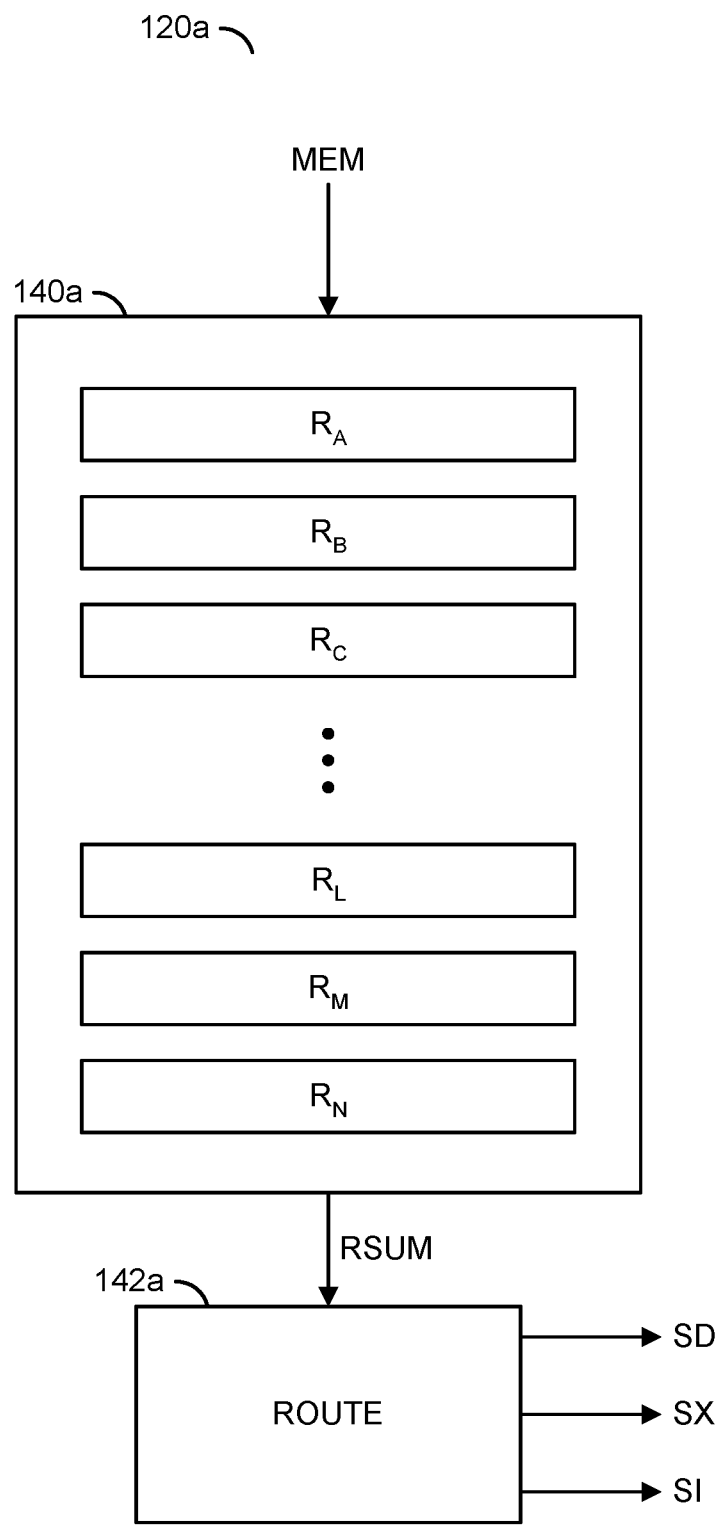
FIG. 7 is a diagram of a horizontal row adder circuit.

Referring to FIG. 7, a diagram of an example implementation of a horizontal row adder circuit 120a is shown. In some embodiments, the summation of vertical column vectors illustrated in FIGS. 3-6 may be implemented as a summation of horizontal row vectors. The row adder circuit 120a generally comprises one or more row adder circuits 140a and a route circuit 142a. The row adder circuits 140a may add rows R$_A$ to R$_N$ of the input data values as received in the signal MEM. The resulting row vector values may be transferred in a signal (e.g., RSUM) to the route circuit 142a. The route circuit 142a may route or direct the row vector values to the signals SD, SX and/or SI, as appropriate. As a result, the sum values of the overlapping windows 106 may be calculated on a row-by-row basis with as the overlapping windows 106 progress horizontally top-to-bottom or bottom-to-top.

Figure 8:
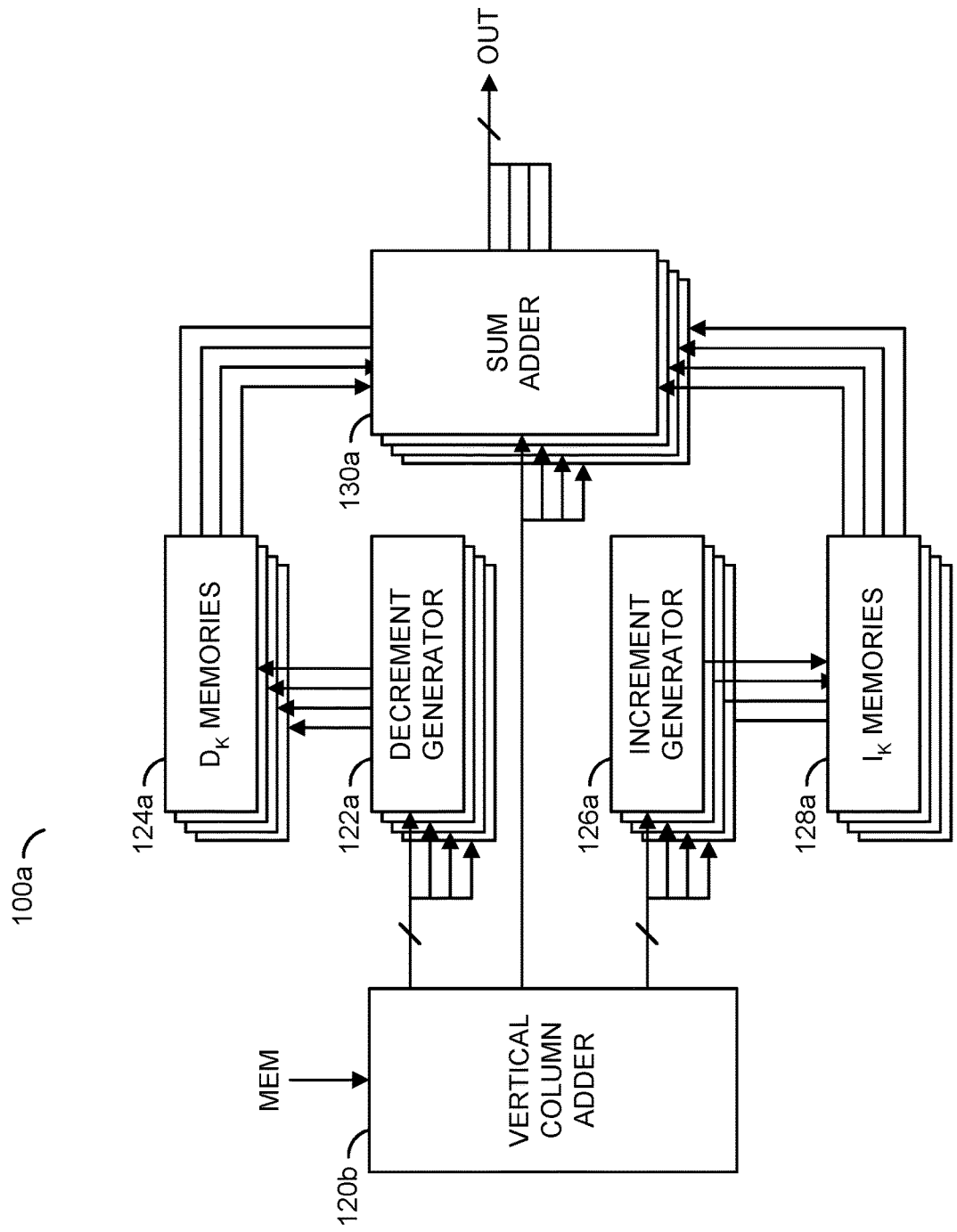
FIG. 8 is a diagram of another summation circuit.

Referring to FIG. 8, a diagram of an example implementation of a summation circuit 100a is shown. The summation circuit 100a may be a variation of the summation circuit 100. The summation circuit 100a generally comprises a block (or circuit) 120b, multiple blocks (or circuits) 122a, multiple blocks (or circuits) 124a, multiple blocks (or circuits) 126a, multiple blocks (or circuits) 128a, and multiple blocks (or circuits) 130a.

The summation circuit 100 shown in FIGS. 3-6 may generate sum values in a raster scan order, a row at a time. By taking advantage of the overlapping windows in the vertical direction, the sum values may be generated in raster scan order multiple (e.g., M) rows at a time. The vertical multiplicity factor M may be an integer greater than one. In the subsequent examples, a value M=4 is described for simplicity of the drawings. To expand in the vertical direction, the circuits 120-130 in FIG. 3 may be replicated by the number of vertical windows processed. The external input data values may be fetched at the same bandwidth such that redundant input of the vertical overlap may be avoided.

The circuit 120b may implement multiple (e.g., M) instantiations (or copies) of the vertical column adder circuit 120, all operating from the input data received in the signal MEM. The vertical column adder circuit 120b may be operational to process multiple sets of columns at a time. The vector values may be presented to the circuits 122a, 126a and 130a.

The circuit 122a may implement multiple (e.g., M) instantiations of the decrement generator circuit 122. The circuit 124a may implement multiple (e.g., M) instantiations of the D$_K$ memory circuit 124. The circuit 126a may implement multiple (e.g., M) instantiations of the increment generator circuit 126. The circuit 128a may implement multiple (e.g., M) instantiations of the I$_K$ memory circuit 128. The circuit 130a may implement multiple (e.g., M) instantiations of the summation adder circuit 130.

As described, M copies of the circuits 120-130 may be implemented in the circuits 120b-130a to handle M horizontal sets of windows in parallel (or simultaneously). In various embodiments, fewer than M copies of the circuits 120-130 may be implemented in the circuits 120b-130a. In such cases, one or more of the available copies may be used in a time-interleaved fashion.

In other embodiments of the apparatus 80, multiple output rows may be generated in parallel, but with the same throughput and almost the same amount of hardware embodiments that generate output data for only a single row at a time. An advantage of such embodiments may be a reduction in the input bandwidth from N*VE to VE+(N−1)*VDF, where N may be an output row multiplicity, VE may be a vertical extent, and VDF may be a vertical decimation factor. A typical case of VDF=1 may result in noticeable input bandwidth reduction.

Figure 9:
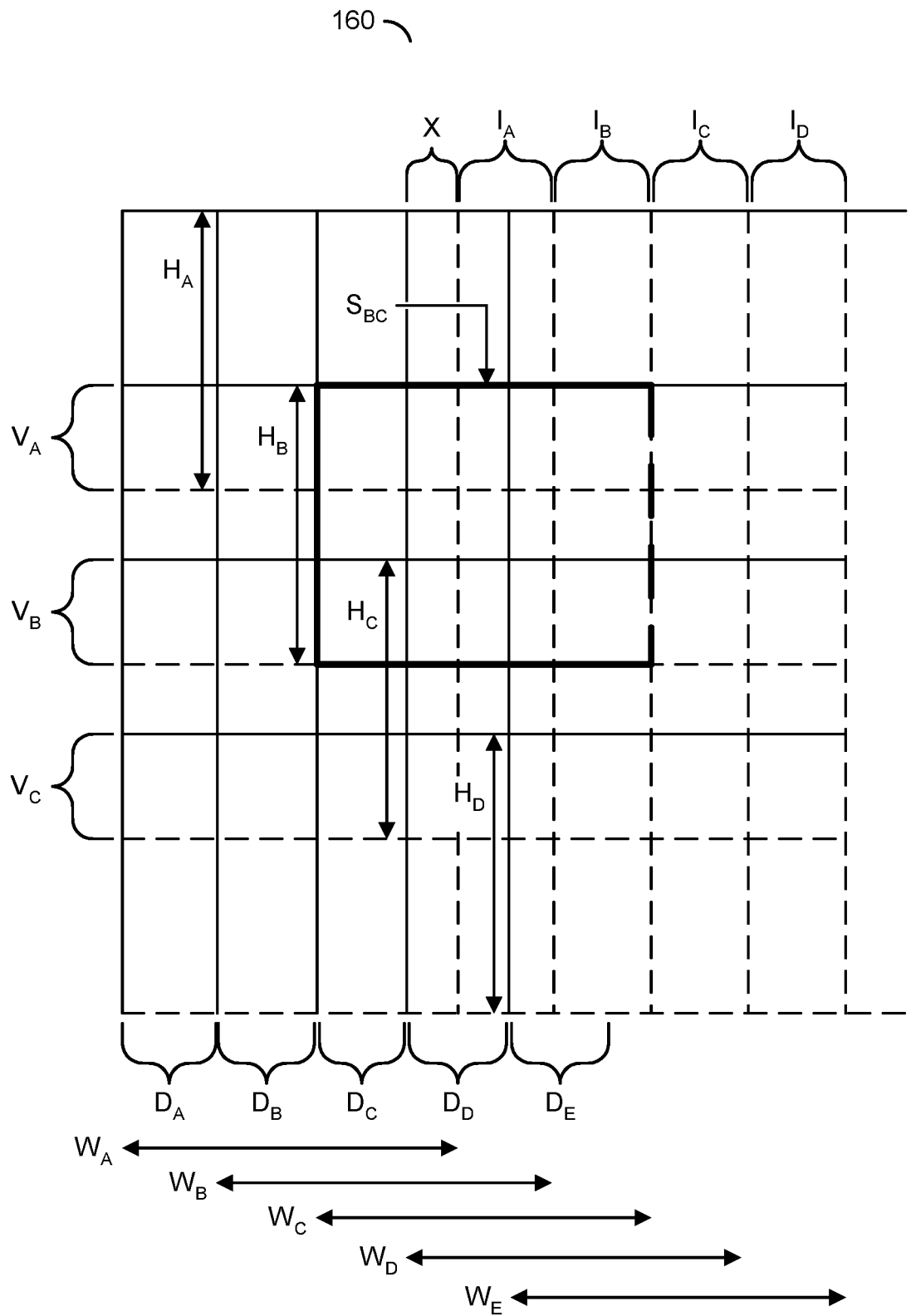
FIG. 9 is a diagram of a set of overlapping sliding windows in two dimensions.

Referring to FIG. 9, a diagram of an example set of overlapping sliding windows in two dimensions is shown. As shown, similar to the horizontally adjacent and overlapping windows, the vertically adjacent and overlapping windows may have the same height H and width W, and are vertically decimated by the vertical decimation factor VDF. In embodiments with a constant vertical decimation factor VDF, the height H may be the same for all windows (e.g., H$_A$=H$_B$=H$_C$=H$_D$). In some embodiments, two or more of the heights H$_A$ to H$_D$ may be different from each other. The horizontal decimation factor HDF generally remains the same and so the width W may be the same for all windows (e.g., W$_A$=W$_B$=W$_C$=W$_D$=W$_E$). In other embodiments, two or more of the widths W$_A$ to W$_E$ may be different from each other.

A topmost set of windows may be defined by a height H$_A$ and overlapping widths W$_A$ to W$_E$ (e.g., windows H$_A$×W$_A$, H$_A$×W$_B$, H$_A$×W$_C$, etc. . . . ) The topmost set of windows in the height H$_A$ may be processed by a set of the parallel circuits in the circuits 120b-130a.

A second set of windows may be defined by a height H$_B$ and the widths W$_A$ to W$_E$ (e.g., windows H$_B$×W$_A$, H$_B$×W$_B$, H$_B$×W$_C$, etc. . . . ) The height H$_B$ may vertically overlap the height H$_A$ by a number of vertical rows (e.g., V$_A$) defined by the vertical decimation factor VDF. The second set of windows in the height H$_B$ may be processed by a second set of the parallel circuits in the circuits 120b-130a.

A third set of windows may be defined by a height HC and the widths W$_A$ to W$_E$ (e.g., windows H×W$_A$, H$_C$×W$_B$, H$_C$×W$_C$, etc. . . . ) The height He may vertically overlap the height H$_B$ by a number of vertical rows (e.g., V$_B$). The third set of windows in the height H$_B$ may be processed by a third set of the parallel circuits in the circuits 120b-130a.

A bottom set of windows may be defined by a height H$_D$ and the widths W$_A$ to W$_E$ (e.g., windows H$_D$×W$_A$, H$_D$×W$_B$, H$_D$×W$_C$, etc. . . . ) The height H$_D$ may vertically overlap the height H$_C$ by a number of vertical rows (e.g., V$_C$). The bottom set of windows in the height H$_B$ may be processed by a fourth set of the parallel circuits in the circuits 120b-130a. In various embodiments, the number of vertically overlapping rows may be similar (e.g., V$_A$=V$_B$=V$_C$).

Figure 10:
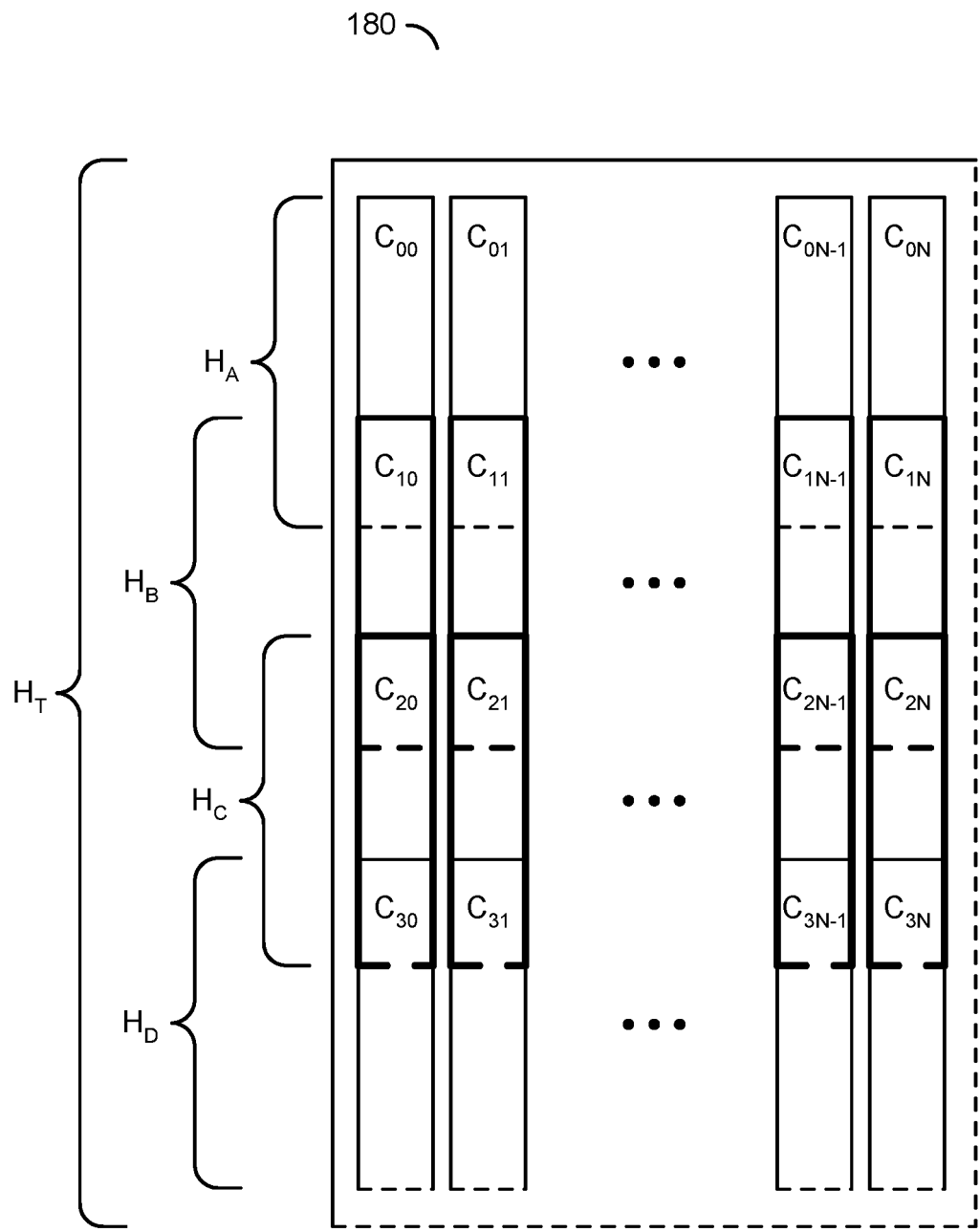
FIG. 10 is a diagram of operation in another vertical column adder circuit.

Referring to FIG. 10, a diagram of an example operation 180 in the vertical column adder circuit 120b is shown. The first instantiation of the adder circuit 120 within the circuit 120b may handle the summation of the vertical column fragments along the height H$_A$. As shown, the data values in a column fragment C$_{00}$-C$_{10}$ within the height H$_A$, a column fragment C$_{01}$-C$_{11}$ within the height H$_A$, . . . , and a column fragment C$_{ON}$-C$_{1N}$ in the height H$_A$ may be summed and presented to the corresponding circuits 122a, 126a and/or 130a.

The second instantiation of the adder circuit 120 within the circuit 120b may handle the summation of the vertical column fragments along the height H$_B$. The data values in a column fragment $C_{10}$-$C_{20}$ within the height $H_B$, a column fragment $C_1$-$C_{21}$ within the height $H_B$, . . . and a column fragment $C_{1N}$-$C_{2N}$ in the height $H_B$ may be summed separately and presented to the corresponding circuits 122a, 126a and/or 130a. Note that some of the data values (e.g., column fragments $C_{10}, C_{11}, \ldots, C_{1N}$) may overlap both the height $H_A$ and the height $H_B$. The vertically overlapping column fragments $C_{10}, C_{11}, \ldots, C_{1N}$ may establish the vertical row $V_A$ in FIG. 9.

The third and the fourth instantiations of the vertical column adder circuit 120 may be included in the vertical column adder circuit 120b to handle the heights $H_C$ and $H_D$, respectively. A total height of each column may be $H_T$. Additional vertical overlaps may establish the vertical rows $V_B$ and $V_C$. The individual vertical column adders may be used to simultaneously add the column fragments, and the overlap data may be shared, avoiding redundant data fetching.

The height $H_T$ shown in FIG. 10 generally denotes the actual column height of input data values fetched together. In the example, the column height $H_T$ may be a sum of all 4 windows heights $H_A$ to $H_D$ minus the 3 overlapping row heights $V_A$ to $V_C$. The vertical column fragments may be added, similar to FIG. 5, with 4 sets of such sub-accumulation groups being calculated in parallel (or simultaneously). The sum values may be calculated in a manner similar to formula 1. In formula 2, the sum values (e.g., $S_{mn}$) generally take into account the vertical windows as follows:

$$S_{mn} = S_{mn-1} - D_{mn-1} + I_{mn-1} \quad (2)$$

Where index m generally slides in the vertical direction and index n slides in the horizontal direction.

Figure 11:
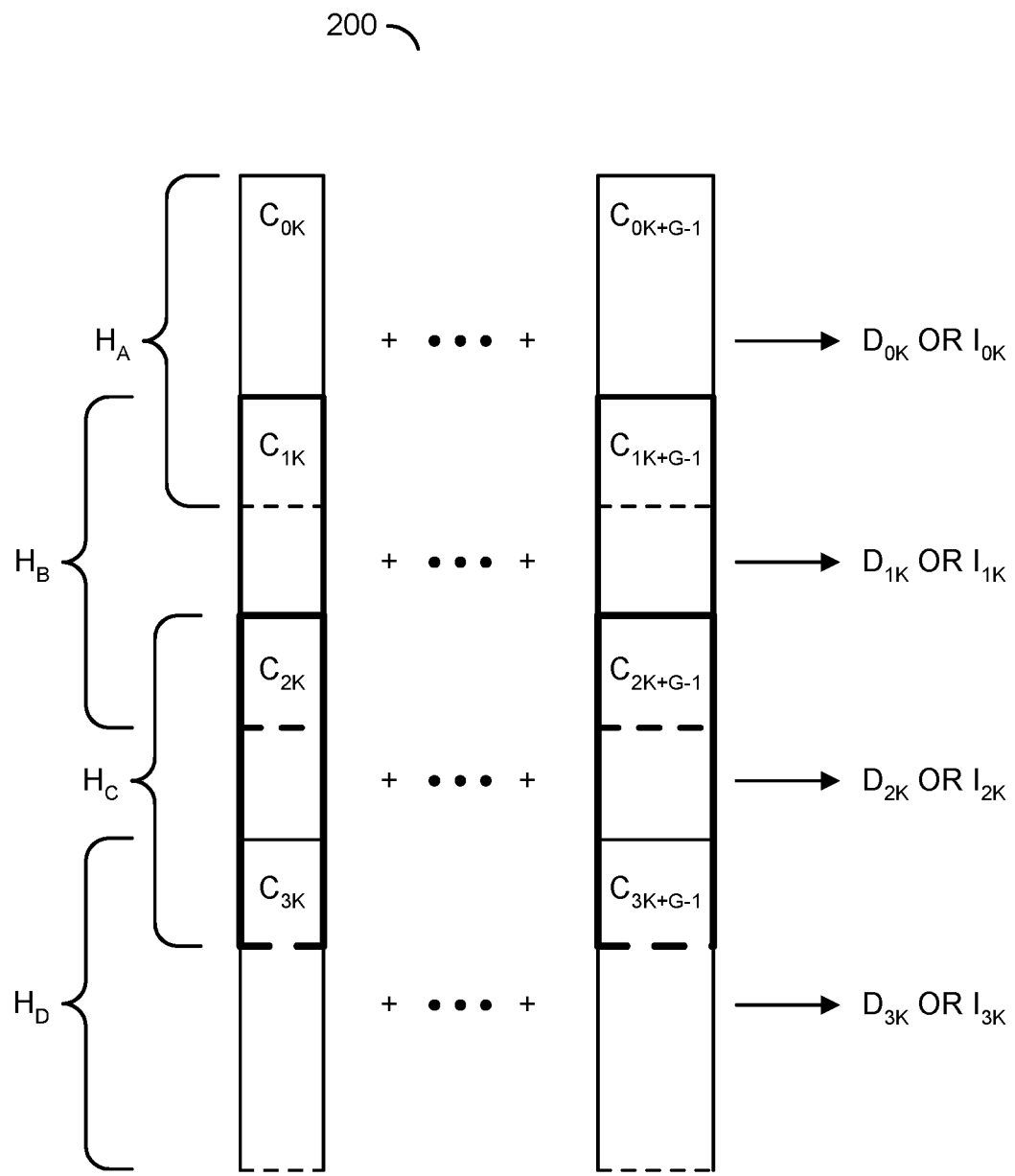
FIG. 11 is a diagram of operations in another decrement generator circuit and another increment generator circuit.

Referring to FIG. 11, a diagram of an example operation 200 of the decrement generator circuit 122a and the increment generator circuit 126a is shown. The vector values in the various heights $H_A$ to $H_D$ may be presented to the decimation generator circuit 122a and the increment generator circuit 126a. The decimation generator circuit 122a and the increment generator circuit 126a may add decimation groups and increment groups of the vector values in each height $H_A$ to $H_D$. The resulting decimation modification values and increment modification values may be presented to the summation adder circuit 130a. The summation adder circuit 130a may add the sum values and the modification values and present the sum values (e.g., $S_{BC}$ in FIG. 9) in the signal OUT.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element. As used herein, the term "simultaneously" is meant to describe events that share some common time period but the term is not meant to be limited to events that begin at the same point in time, end at the same point in time, or have the same duration.

While the invention has been particularly shown and described with reference to embodiments thereof, it will be understood by those skilled in the art that various changes in form and details may be made without departing from the scope of the invention.

The invention claimed is:

1. An apparatus comprising:
a memory configured to store a first array of data values, a second array of first modification values, and a third array of second modification values; and
a circuit configured to (a) calculate a plurality of window values for each window position of a first sliding window as the first sliding window is stepped by a predetermined step size along a particular axis of said first array of data values, and (b) calculate said first and said second modification values by summing portions of said first array of data values that correspond to said predetermined step size of said first sliding window, wherein (i) a first window value of an initial position of said first sliding window is calculated by summing portions of said first array of data values encompassed by said first sliding window at said initial position, and (ii) each remaining window value of said plurality of window values is calculated by using one of said first modification values and one of said second modification values corresponding to a current position of said first sliding window to modify the window value corresponding to a preceding sliding window position.

2. The apparatus according to claim 1, wherein (i) each of said first and said second modification values is calculated by summing a plurality of vector values and (ii) each of said vector values is calculated by summing corresponding data values in corresponding data vectors from said first array of data values.

3. The apparatus according to claim 2, wherein each of said data vectors comprises (i) one or more columns in said first array of data values or (ii) one or more rows in said first array of data values.

4. The apparatus according to claim 1, wherein said first array of data values comprises a multidimensional array.

5. The apparatus according to claim 1, wherein (i) each of said first and said second modification values corresponds to one of a plurality of modification arrays and (ii) said first sliding window comprises a non-integer number of said modification arrays.

6. The apparatus according to claim 1, wherein said circuit is further configured to calculate a window value of a second sliding window that overlaps said first sliding window in said first array of data values along a second axis perpendicular to said particular axis by summing a plurality of said first and second modification values that correspond to said data values that reside within said second sliding window.

7. The apparatus according to claim 6, wherein said data values that reside in both of said first sliding window and said second sliding window are fetched only once from said memory to calculate both said window values of said first sliding window and said window value of said second sliding window.

8. The apparatus according to claim 6, wherein said window value of said first sliding window and said window value of said second sliding window are calculated in parallel.

9. The apparatus according to claim 6, wherein one or more data vectors fetched from said memory contain said data values that reside in both said first sliding window and said second sliding window.

10. The apparatus according to claim 1, wherein said memory and said circuit are configured as part of a computer vision system.

11. A method to calculate window sums in overlapping windows, comprising the steps of:
fetching data vectors of a first array of data values from a memory;
calculating a plurality of window values for each window position of a first sliding window as the first sliding window is stepped by a predetermined step size along a particular axis of said first array of data values;
calculating a plurality of first modification values and a plurality of second modification values by summing portions of said data vectors of said first array of data values that correspond to said predetermined step size of said first sliding window; and
storing a second array of said first modification values and a third array of said second modification values in said memory, wherein a first window value of an initial position of said first sliding window is calculated by summing portions of said data vectors of said first array of data values encompassed by said first sliding window at said initial position, and each remaining window value of said plurality of window values is calculated by using one of said first modification values and one of said second modification values corresponding to a current position of said first sliding window to modify the window value corresponding to a preceding sliding window position.

12. The method according to claim 11, wherein (i) each of said first and said second modification values is calculated by summing a plurality of vector values and (ii) each of said vector values is calculated by summing said data values in a corresponding one of said data vectors.

13. The method according to claim 11, wherein each of said data vectors comprises (i) one or more columns in said first array of data values or (ii) one or more rows in said first array of data values.

14. The method according to claim 11, wherein said first array of data values comprises a multidimensional array.

15. The method according to claim 11, wherein (i) each of said first and said second modification values corresponds to one of a plurality of modification arrays and (ii) said first sliding window comprises a non-integer number of said modification arrays.

16. The method according to claim 11, further comprising the step of:
calculating a window value of a second sliding window that overlaps said first sliding window in said first array of data values along a second axis perpendicular to said particular axis by summing a plurality of said first and second modification values that correspond to said data values that reside within said second sliding window.

17. The method according to claim 16, wherein said data values that reside in both of said first sliding window and said second sliding window are fetched only once from said memory to calculate both said window values of said first sliding window and said window value of said second sliding window.

18. The method according to claim 16, wherein said window value of said first sliding window and said window value of said second sliding window are calculated in parallel.

19. The method according to claim 16, wherein one or more of said data vectors fetched from said memory contain said data values that reside in both said first sliding window and said second sliding window.

20. The method according to claim 11, wherein said method calculates said window values of subsequent sliding window positions without summing said data vectors of said subsequent sliding windows separately.

\* \* \* \* \*